United States Patent Office 3,132,693
Patented May 12, 1964

3,132,693
COMPOSITION COMPRISING HYDROXYETHYL CELLULOSE, POLYVINYLPYRROLIDONE AND ORGANIC SULFONATE, CEMENT SLURRY PREPARED THEREFROM AND METHOD OF CEMENTING WELLS THEREWITH
Charles Frederick Weisend, P.O. Box 4232, Dallas, Tex.
No Drawing. Filed Dec. 26, 1961, Ser. No. 162,249
7 Claims. (Cl. 166—33)

This invention relates to new and useful improvements in low water loss additives for cement and methods of utilizing the same.

In the drilling, completion and servicing of water, oil and gas wells and in the subsequent grouting thereof, it is customary to utilize cement or concrete slurries, normally termed in the industry a "cement" or "cementing" slurry, for the purpose of sealing various portions of the well bore, for anchoring well pipe or well casing therein, and for other well known and established purposes. In most cases, the cement slurry is introduced into the well bore under quite considerable pressure, as through the use of pumps and the like, and the slurry is also subjected within the well bore to the hydrostatic pressure of the column of fluid thereabove which may extend for quite a few thousand feet. The slurry is also subjected to elevated temperatures within the well bore, these temperatures usually increasing more or less in direct proportion to the depth of the well bore.

Many types of cement compositions are employed for formulating these cementing slurries, and numerous additives are employed therewith for the purpose of accelerating or retarding the setting time of the cement varying the ultimate hardness or strength thereof, and for various other purposes well known in this art. One particular and important problem in this industry has been the attaining of a satisfactory composition which will function to prevent the loss of fluid, normally water, from the cement slurry to an undesirable degree so as to preclude proper hydration of the cement, as well as the furnishing of such a material which is satisfactorily resistant to the high temperatures often encountered in well bores. Not only is the loss of fluid detrimental to the quality of the set cement as finally obtained, but it is also desirable to protect within the well bore water sensitive shale sections that may weaken and break down due to the filtration of water or liquid thereinto and bentonitic clays which may swell due to the filtration of liquid or water thereinto and cause partial or complete blocking of the well bore. Of course, reducing the loss of water from the slurry results in the manitenance of lower viscosities of the slurry, and reduced circulating pressures are required for its proper placement.

It is therefore, a principal object of this invention to provide a low water loss additive for cements which is resistant to high temperatures and which maintains the fluid loss at the desired low level without increasing the viscosity of the cement slurry appreciably or overly retarding the thickening and setting times of the cements or impairing the set strength thereof.

A further object of the invention is to provide an improved low water loss additive which may be employed in relatively low percentages in a cement slurry and which will produce the desired low fluid loss as measured under pressure and other prescribed conditions.

Still an additional object of the invention is to provide an improved cement slurry containing the relatively low percentage of an improved low water loss additive functioning to maintain fluid loss from the slurry at the desired low levels without appreciable increase of the viscosity and under elevated temperatures.

A still additional object of the invention is to provide improved cementing methods utilizing a cementing slurry containing an improved low water loss additive in relatively low percentages wherein the fluid loss is maintained at acceptable low levels and in which harmful effects from elevated temperatures do not result.

Other and more particular objects will be apparent from a reading of the following description and claims.

The invention, and the methods thereof, will be more readily understood from a reading of the following specification wherein specific examples of the invention are set forth and wherein the methods and means designed to carry out the invention will be described, together with other features of the invention.

The composition, which will be referred hereinafter as "Mixture," which is included in the subject of this invention and utilized in the cementing slurries and cementing methods disclosed herein is a water loss control additive for cementing compositions utilized in primary or squeeze cementing. The material is a free flowing powder that can be added to the dry cement or to the mixing water, or other fluid, the addition of the Mixture necessary to provide an acceptable fluid loss amounting to 1.0 to 1.1% in most cements. Usually this cement composition is adequate for squeeze cementing and will produce a fluid loss of from 50–60 cc., as measured on 325 mesh screen under 1000 p.s.i. pressure, but the fluid loss of different cementing compositions may be varied to fit most well requirements by raising or lowering the concentration in the composition of the Mixture. The principal advantages of Mixture in a cementing composition are as follows:

For Squeeze Cementing:
(1) Reduces premature dehydration into the tubing and casing while squeezing perforations.
(2) Long perforated intervals can often successfully be squeezed in a single stage.
(3) Satisfactory squeeze results at low pressures without over displacing.
(4) High pressure squeezing by hesitation technique with filter cake build up in perforations.
(5) For water sensitive shale sections that may weaken or break down due to cement filtrate; granular bridging material may also be helpful.
(6) Reduces the amount of filtrate which can penetrate formations containing bentonite clays.
(7) For pancake squeeze to depress water coning.

For Casing Cementing:
(1) Lessens the possibility of water and/or emulsion blocks and blocks caused by bentonitic clay swelling due to filtrate from cement.
(2) Helps protect water sensitive shales.
(3) Reduces premature bridging in annuli which may be caused by dehydration.
(4) Reduces loss of water from slurry thus maintaining lower viscosities and lower circulating pressures.

The Mixture drastically reduces fluid loss from the cement slurry and is effective over a wide temperature range while avoiding adversely affecting the slurry or the properties and qualities of the set cement. The Mixture is compatible with most cements and additives with which it has been tested, including pozzolanic types, bentonite accelerators and the like, and is superior to other known fluid loss additives on a pound per pound basis under high pressure test conditions utilizing test pressures of the magnitude of 1000 pounds per square inch. The Mixture includes a nonionic water soluble synthetic colloid, a high molecular weight polyvinylpyrrolidone, and the sodium salt of naphthalene sulfonate condensed with formaldehyde. Specifically, the Mixture includes 40–50% by weight of hydroxethyl cellulose 2–10% by weight of 40,000 molecular weight polyvinylpyrrolidone, and 35–58% by weight of a sodium salt of a naphthalene sulfonate condensed with formaldehyde for which may be substituted any organic sulfonate dispersing agent.

For optimum results, the specific formulation should consist of:

52.5% hydroxyethyl cellulose, 80 mesh U.S. Sieve Series viscosity at 20° C. 2% aqueous solution, 225-325 centipoises.

10% polyvinylpyrrolidone, 40,000 molecular weight.

37.5% sodium salt of naphthalene sulfonate condensed with formaldehyde.

The hydroxyethyl cellulose may have any particle size from 20 mesh, U.S. Sieve Series, up, and desirably is of 80 mesh, U.S. Sieve Series. The viscosity at 20° C. of a 2% aqueous solution of the hydroxyethyl cellulose may vary from 200 to 15,000 centipoises, but desirably, as stated above, is 225-325 centipoises. The polyvinylpyrrolidone must have a molecular weight of the order of magnitude of 40,000, but any organic sulfonate dispersing agent may be employed.

The Mixture is formulated by a simple combining of the several ingredients and is immediately ready for use after suitable packaging.

The Mixture may increase slightly the viscosity of the cement slurry, and when using API Class A Portland cements, 5.65 gallons of water per standard sack of cement, normally 100 pounds, is recommended to produce a normal slurry viscosity, instead of the usual 5.2 gallons of water. This water-cement ratio of 0.50 (5.65 gallons per sack) will result in a slurry weight of 15.2 pounds per gallon. The regular water ratios may be used in many compositions such as bentonite cements and other light weight compositions. No difficulties have been encountered in mixing slurries with the recommended water, either in laboratory tests or through utilization of conventional jet mixers.

The Mixture has a mild retarding effect upon the thickening time and final strength of most cements, but calcium chloride or other equivalent materials may be used to counteract this effectively without affecting the fluid loss to any appreciable extent. An accelerator may desirably be used on casing or squeeze cementing jobs to give increased strength in 24 hours where the cementing temperature is 100° F., calcium chloride can be added, but should be used with caution. In instances where a long thickening time is desired, such as on hesitation squeeze cementing jobs, this retarding property is an advantage and no additional retarder is needed. A pump-time of 3 hours or in excess thereof, can normally be obtained under API 6000 foot squeeze conditions and 8000 foot casing cementing conditions using Portland or light weight cementing compositions without the addition of a retarder.

The Mixture has been tested in API Class E cements under 12,000 foot squeeze cementing conditions and 14,000 casing cementing conditions (213° F. and 206° F. cementing temperatures, respectively) and found to be very heat stable. In most instances, slightly more of the Mixture is needed at higher temperatures to maintain fluid loss control comparable to API Class A cement at lower temperatures. Under these higher temperatures, 1.1 or 1.2% of the Mixture is sufficient with most retarded cements, the Mixture appearing to be compatible with most cement additives.

The Mixture gives fluid loss control under high pressure test conditions of 1,000 pounds per square inch on a 325 mesh screen superior to other fluid loss additives on a pound per pound basis, and 1% of the Mixture or 1 pound per standard sack is generally adequate with most cements but can be varied to achieve higher or lower fluid loss rates when desired. The Mixture is a slight retarder which on hesitation squeeze jobs is an advantage, but at temperatures less than 100° F. 2% calcium chloride or the equivalent may be employed. Portland or light weight cement compositions containing the Mixture may be used at bottom hole static temperatures of 100° F., but above this temperature, retarded cements should be employed or a retarder should be added to the Portland or light weight cement composition. The Mixture is very heat stable and remains heat stable and effective in the cement slurry up to temperatures of 260° F., a temperature not often exceeded in well bores. The effectiveness of the Mixture above 260° F. is determinable in conjunction with the particular cementing composition to be employed and the conditions of use of the slurry.

Extensive testing of the Mixture in cement slurries have been carried out and the following results obtained:

DATA

API CLASS A CEMENTS—SLURRY PROPERTIES

| Mixture, percent | Water Ratio | | Weight | | Volume, cu. ft./sack |
|---|---|---|---|---|---|
| | Gal./sack | Cu. ft./sack | Lbs./gal. | Lbs./cu. ft. | |
| 0.0 | 5.2 | 0.70 | 15.6 | 117 | 1.18 |
| 1.0 | 5.6 | 0.75 | 15.3 | 114 | 1.23 |
| 1.5 | 5.6 | 0.75 | 15.3 | 114 | 1.23 |

FLUID LOSS PROPERTIES USING DIFFERENT BRANDS OF API CLASS A CEMENTS
[Water—0.50 or 5.6 gals./sack]

| Cement | Mixture, percent | Slurry viscosity, poises | | 1,000 p.s.i.— 325 mesh screen, cc./30 minutes |
|---|---|---|---|---|
| | | Initial | 20 min. | |
| Universal Atlas Portland | 1.0 | 5 | 8 | 52 |
| Trinity Portland | 1.0 | 8 | 18 | 44 |
| Oklahoma Portland | 1.0 | 8 | 18 | 38 |
| Halliburton Portland | 1.0 | 7 | 9 | 38 |
| Foreman Portland | 1.0 | 5 | 8 | 38 |
| Dundee Portland | 1.0 | 7 | 7 | 58 |
| Ideal Portland | 1.0 | 5 | 10 | 58 |
| Do | [1] 1.0 | 5 | 12 | 68 |
| Do | 1.2 | 16 | 23 | 32 |
| Lone Star Portland | 0.8 | 4 | 11 | 90 |
| Do | 1.0 | 5 | 12 | 62 |
| Do | 1.25 | 10 | 16 | 40 |
| Do | [1] 1.0 | 8 | 9 | 94 |
| Do | [2] 1.0 | 12 | 32 | 58 |

[1] 2.0 CaCl₂.
[2] 3.0 salt.

FLUID LOSS PROPERTIES AFTER PUMPING UNDER SIMULATED WELL CONDITIONS

| Mixture, percent | API well conditions | Time pumped | 1,000 p.s.i., 325 mesh screen, cc./30 minutes |
|---|---|---|---|
| 0.75 | 6,000′ Csg | 1:30 | 92 |
| 0.85 | 6,000′ Csg | 1:30 | 54 |
| 1.00 | 6,000′ Csg | 1:30 | 36 |
| 1.25 | 6,000′ Csg | 1:30 | 26 |
| 0.80 | 8,000′ Csg | 3:00 | 72 |
| 1.00 | 8,000′ Csg | 3:00 | 46 |
| 1.25 | 8,000′ Csg | 3:00 | 28 |
| 1.00 | 6,000′ Sq | 3:00 | 60 |
| 1.25 | 6,000′ Sq | 3:00 | 22 |
| 1.00(3.0%Salt) | 4,000′ Csg | 3:00 | 44 |
| 1.00(3.0%Salt) | 6,000′ Csg | 1:30 | 36 |
| 1.00(2.0%CaCl₂) | 6,000′ Csg | 1:30 | 44 |
| 1.00(3.0%Salt) | 6,000′ Csg | 3:00 | 44 |
| 1.00(2.0%CaCl₂) | 6,000′ Csg | 3:00 | 56 |

THICKENING TIME- HALAD-9—API CLASS A CEMENT
[Thickening Time—Hours: Minutes]

| Mixture, percent | API well conditions, feet | | | | |
|---|---|---|---|---|---|
| | Casing | | | Squeeze | |
| | 4,000 | 6,000 | 8,000 | 6,000 | 8,000 |
| 0.00 | 3:00+ | 2:15 | 2:05 | 1:12 | 0:52 |
| 0.80 | 3:00+ | 3:00+ | 3:00+ | 3:00+ | 2:17 |
| 0.85 | 3:00+ | 3:00+ | 3:00+ | 3:00+ | 2:20 |
| 1.00 | 3:00+ | 3:00+ | 3:00+ | 3:00+ | 2:26 |
| 1.25 | 3:00+ | 3:00+ | 3:00+ | 3:00+ | 2:47 |

THICKENING TIMES ON DIFFERENT BRANDS OF API CLASS A CEMENTS

| Portland cement | Mixture, percent | API well conditions | Thickening time, hours: minutes |
|---|---|---|---|
| Lone Star | 1.0 | 8,000′ Csg | 3:00+ |
| Atlas | 1.0 | 8,000′ Csg | 3:30 |
| Halliburton | 1.0 | 8,000′ Csg | 3:00+ |
| Trinity | 1.0 | 8,000′ Csg | 3:00+ |
| Oklahoma | 1.0 | 8,000′ Csg | 2:54 |
| Ideal | 1.0 | 8,000′ Csg | 3:00+ |

EFFECT OF ACCELERATORS ON THICKENING TIME

| Mixture percent | Percent | Accelerator | Thickening time, hours: min., 4,000 ft., API Csg. test |
|---|---|---|---|
| 1.0 | 2.0 | $CaCl_2$ | 2:30+ |
| 1.0 | 3.0 | Salt | 3:00 |

COMPRESSIVE STRENGTHS, P.S.I.—API CLASS A PORTLAND CEMENT—API PRESSURE CURING CONDITIONS
[24 Hours]

| Mixture, percent | Percent accelerator | API curing conditions | | |
|---|---|---|---|---|
| | | 800 p.s.i., 95° F. | 3,000 p.s.i., 140° F. | 3,000 p.s.i., 200° F. |
| 0.00 | | 2,750 | 5,350 | 5,057 |
| 0.00 | 2.0 $CaCl_2$ | 3,485 | 4,000+ | 4,000+ |
| 0.00 | 3.0 Salt | 3,725 | 4,000+ | 4,000+ |
| 0.80 | | 1,585 | 3,475 | |
| 0.80 | 2.0 $CaCl_2$ | 2,070 | 3,000+ | |
| 0.80 | 3.0 Salt | 2,100 | 3,000+ | |
| 1.00 | | 1,430 | 3,360 | 5,250 |
| 1.00 | 2.0 $CaCl_2$ | 2,135 | 3,000+ | |
| 1.00 | 3.0 Salt | 1,575 | 3,000+ | |
| 1.25 | | 1,465 | 3,875 | |
| 1.25 | 2.0 $CaCl_2$ | 2,185 | 4,000+ | |
| 1.25 | 3.0 Salt | 1,825 | 4,000+ | |

API NON-PRESSURE CURING CONDITIONS

| Mixture, percent | 80° F. | 100° F. | 120° F. | 140° F. | 160° F. |
|---|---|---|---|---|---|
| 0.00 | 1,550 | 1,995 | 2,950 | 4,260 | 4,165 |
| 0.75 | 620 | 730 | 1,545 | 2,550 | 2,900 |
| 1.00 | 445 | 600 | 1,485 | 2,190 | 2,530 |
| 1.25 | 305 | 390 | 1,265 | 1,905 | 2,335 |

2.0 PERCENT CALCIUM CHLORIDE

| Mixture, percent | 80° F. | 100° F. | | | |
|---|---|---|---|---|---|
| 0.00 | 2,665 | 3,550 | | | |
| 0.75 | 2,045 | 2,500 | | | |
| 1.00 | 1,735 | 2,270 | | | |
| 1.25 | 1,755 | 2,105 | | | |

FILTER CAKE STRENGTHS, P.S.I.

These test specimens were obtained by dehydrating the slurries at 1000 p.s.i. The filtered cores of cement were removed and put in a mold at the specified temperature for 8 hours under API pressure conditions. From the set specimen, a 1-inch cube was cut for the compressive strength tests. This is not according to API or ASTM strength measurement standards, but is indicative of the hardness of these cakes after dehydrating water on the fluid loss test.

PORTLAND CEMENT—API CLASS A
[8-Hour Curing Times]

| Mixture, percent | Percent additive | API curing conditions | |
|---|---|---|---|
| | | 800 p.s.i., 95° F. | 3,000 p.s.i., 140° F. |
| 0.8 | 0.0 | 2,400 | 12,400 |
| 0.8 | 2.0 $CaCl_2$ | 3,160 | 12,100 |
| 0.8 | 3.0 Salt | 2,400 | 7,400 |
| 1.00 | 0.0 | 2,080 | 12,200 |
| 1.00 | 2.0 $CaCl_2$ | 3,400 | 12,000 |
| 1.00 | 3.0 Salt | 780 | 12,200 |
| 1.25 | 0.0 | 400 | 12,100 |
| 1.25 | 2.0 $CaCl_2$ | 8,280 | 9,000 |
| 1.25 | 3.0 Salt | 610 | 12,000 |

API CLASS E CEMENTS—SLURRY PROPERTIES

| Mixture, Percent | Water ratio | | Slurry weight | | Slurry volume, cu. ft./ sack |
|---|---|---|---|---|---|
| | Gals./sack | Cu. ft./sack | Lbs./gal. | Lbs./cu. ft. | |
| 0.0 | 4.5 | 0.60 | 16.2 | 121 | 1.08 |
| 1.0 | 5.2 | 0.70 | 15.6 | 117 | 1.18 |
| 1.5 | 5.2 | 0.70 | 15.6 | 117 | 1.18 |

FLUID LOSS PROPERTIES USING DIFFERENT BRANDS OF API CLASS E CEMENT

| Cement | Mixture, percent | 1,000 p.s.i., 325 mesh screen, cc./30 minutes |
|---|---|---|
| Unaflo | 0.80 | 84 |
| Do | 1.00 | 28 |
| Do | 1.25 | 22 |
| Do | 1.50 | 22 |
| Texcor | 0.80 | 46 |
| Do | 1.00 | 36 |
| Do | 1.25 | 24 |
| Trinity Inferno | 1.00 | 40 |
| Hi-Temp | 1.00 | 38 |
| Starcor | 1.00 | 30 |

FILTER CAKE STRENGTHS, P.S.I.

These test specimens were obtained by dehydrating the slurries at 1000 p.s.i. The filtered cores of cement were removed and put in a mold at the specified temperature for 8 hours under 3,000 p.s.i. pressure. From the set specimen, a 1-inch cube was cut for the compressive strength tests. This is not according to API or ASTM strength measurement standards, but is indicative of the hardness of these cakes after dehydrating water on the fluid loss test.

API CLASS E CEMENTS
[Curing Time—12 Hours]

| Cement | Mixture, percent | API curing conditions | |
|---|---|---|---|
| | | 200° F. | 230° F. |
| Texcor | 1.1 | 3,850 | |
| Do | 1.0 (0.2% CMHEC [1]) | [2] 8,700 | [3] 5,020 |
| Do | 1.1 (0.4% CMHEC) | | [3] 3,920 |
| Unaflo | 1.0 (0.2% CMHEC) | | 12,000 |
| Do | 1.0 (0.5% CMHEC) | | [2] 3,220 |
| Trinity Inferno | 1.0 | 7,800 | |
| Do | 1.1 (0.4% CHEC) | [3] 960 | [3] 6,420M |

[1] Carboxymethylhydroxyethyl cellulose.
[2] Cake strengths taken from slurries after pumping 6 hours under the above squeeze conditions, then cured 12 hours before testing.
[3] Cake strengths taken from slurries after pumping 1½ hours under the above squeeze conditions, then cured 12 hours before testing.

FLUID LOSS PROPERTIES ON API CLASS E CEMENTS
[After Pumping Under API Well Conditions]

| Cement | Mixture, percent | API well conditions | Time pumped, hours | 1,000 p.s.i., 325 mesh screen, cc./30 minutes |
|---|---|---|---|---|
| Unaflo | 1.00 | 14,000′ Csg | 1:30 | 50 |
| Do | 1.25 | 14,000′ Csg | 2:00 | [1] 38(48) |
| Do | 1.50 | 14,000′ Csg | 2:00 | [1] 38(38) |
| Texcor | 1.00 | 12,000′ Csg | 3:00 | 78 |
| Do | 1.00 | 14,000′ Csg | 1:30 | 74 |
| Do | 1.10 | 14,000′ Csg | 3:00 | 46 |
| Do | 1.20 | 14,000′ Csg | 1:30 | 32 |
| Do | 1.25 | 14,000′ Csg | 3:00 | 46 |
| Do | 1.50 | 14,000′ Csg | 2:00 | 56 |
| Do | 1.50 | 14,000′ Csg | 3:00 | 48 |
| Trinity Inferno | 1.00 | 12,000′ Csg | 3:00 | 62 |
| Do | 1.00 | 14,000′ Csg | 1:30 | 99 |
| Do | 1.00 | 14,000′ Csg | 4:00 | 68 |
| Do | 1.20 | 14,000′ Csg | 1:30 | 44 |
| Hall. Hi-Temp | 1.00 | 14,000′ Csg | 1:30 | 111 |
| Do | 1.20 | 14,000′ Csg | 1:30 | 38 |
| Starcor | 1.00 | 12,000′ Csg | 1:30 | 42 |
| Do | 1.00 | 12,000′ Csg | 4:00 | 32 |
| Unaflo | 1.00 | 12,000′ Csg | 3:30 | 40 |
| Hi-Temp | 1.00 | 12,000′ Csg | 3:30 | 46 |

[1] Carboxymethylhydroxyethyl cellulose.
[2] Cake strengths taken from slurries after pumping 6 hours under the above squeeze conditions, then cured 12 hours before testing.
[3] Cake strengths taken from slurries after pumping 1½ hours under the above squeeze conditions, then cured 12 hours before testing.

THICKENING TIME, MIXTURE—API CLASS E CEMENTS

| Cement | Mixture, percent | Thickening time, hours:minutes— API casing conditions, feet | | |
|---|---|---|---|---|
| | | 10,000 | 12,000 | 14,000 |
| Texcor | 0.00 | 4:00+ | 4:00+ | 2:55 |
| Do | 1.00 | 4:00+ | 4:00+ | 4:38 |
| Unaflo | 0.00 | 4:00+ | 3:00+ | 2:57 |
| Do | 1.00 | 4:00+ | 3:00+ | 3:00+ |
| Trinity Inferno | 0.00 | 4:00+ | 4:00+ | 3:32 |
| Do | 1.00 | 4:00+ | 4:00+ | 4:00+ |
| Hi-Temp | 0.00 | 4:00+ | 4:00+ | 3:25 |
| Do | 1.00 | 4:00+ | 4:00+ | 3:01 |
| Starcor | 0.00 | 3:00+ | 2:16 | |
| Do | 1.00 | 4:00+ | 4:00+ | 3:07 |

THICKENING TIME, MIXTURE—API CLASS E CEMENTS

| Cement | Mixture, percent | Thickening time, hours:minutes— API squeeze conditions, feet | | | |
|---|---|---|---|---|---|
| | | 6,000 | 8,000 | 10,000 | 12,000 |
| Texcor | 1.00 | 4:00+ | ¹4:00+ | ²4:00+ | ³4:41* |
| Unaflo | 1.00 | 4:00+ | ⁴4:00+ | 4:00+ | 4:00* |
| Trinity Inferno | 1.00 | 4:00+ | 4:00+ | ⁵4:00+ | ⁶5:05* |

*0.3% CMHEC.
Fluid loss after pumping:
(1) 66 cc.  (2) 88 cc.  (3) 46 cc.  (4) 44 cc.  (5) 84 cc.  (6) 76 cc.

24 HOUR COMPRESSIVE STRENGTHS— API CLASS E CEMENTS

| Cement | Mixture, percent | API Curing Conditions—3,000 p.s.i., curing pressure | | | |
|---|---|---|---|---|---|
| | | 140° F. | 170° F. | 200° F. | 260° F. |
| Texcor | 0.00 | 2,975 | 3,310 | 8,110 | 4,510 |
| Do | 1.00 | 475 | N.S. | 4,360 | 5,050 |
| Unaflo | 0.00 | 2,600 | 2,525 | 5,360 | 5,000+ |
| Do | 1.00 | 1,180 | 1,575 | 4,275 | 4,000+ |
| Trinity Inferno | 0.00 | 2,750 | 5,000 | 5,725 | 5,000+ |
| Do | 1.00 | 2,075 | 2,650 | 4,125 | 4,000+ |
| Hi-Temp | 0.00 | 2,650 | 4,450 | 6,025 | 4,910 |
| Do | 1.00 | N.S. | N.S. | 4,585 | 6,185 |
| Starcor | 0.00 | 1,950 | 2,185 | 3,335 | 3,310 |
| Do | 1.00 | .N.S | 45 | 2,857 | 4,125 |

N.S.—Not set.

The fluid loss of the cement slurries is determined by exposing a volume of the slurry to a screen of 325 mesh of a given size under 1000 pounds per square inch pressure and determining the volume of the fluid passing through the screen in 30 minutes time, this test being carried out in accordance with the standard API specification for determination of fluid loss as prescribed by the American Petroleum Institute.

In utilizing the Mixture in a cementing slurry or a grouting composition as used in water, oil, or gas wells a standard cement preparation, with or without additives and 1–1.5% by weight of the mixture based on the weight of the cement is combined with the usual quantity of water or a slightly increased amount of water and then introduced into the well under usual cementing or grouting conditions and steps. The methods herein involved utilize those previously employed in this industry with the addition of the prescribed amount of the Mixture, namely, 1–1.5% by weight of the mixture as compared to the weight of the cement before or as the cement is combined with the water.

The foregoing description of the invention is explanatory thereof and various changes in the nature and percentages of the materials as well as in the details of the utilization thereof may be made within the scope of the appended claims without departing from the spirit of the invention.

What I claim and desire to secure by Letters Patent is:

1. A low water loss additive for cements employed in wells including by weight, 40–55% hydroxyethyl cellulose having a particle size no larger than 20 mesh U.S. Sieve Series a 2% aqueous solution of which has a viscosity at 20° C. of 200–15,000 centipoises, 2–10% polyvinylpyrrolidone having a molecular weight of the order of magnitude of 40,000, and 35–58% of an organic sulfonate dispersing agent.

2. A low water loss additive for cements employed in wells including by weight, 40–55% hydroxyethyl cellulose having a particle size no larger than 20 mesh U.S. Sieve Series a 2% aqueous solution of which has a viscosity at 20° C. of 200–15,000 centipoises, 2–10% polyvinylpyrrolidone having a molecular weight of the order of magnitude of 40,000, and 35–58% of a sodium salt of naphthalene sulfonate condensed with formaldehyde.

3. A low water loss additive for cements employed in wells including by weight, 40–55% hydroxyethyl cellulose having a particle size no larger than 80 mesh U.S. Seive Series a 2% aqueous solution of which has a viscosity at 20° C. of 225–325 centipoises, 2–10% polyvinylpyrrolidone having a molecular weight of the order of magnitude of 40,000, and 35–58% of an organic sulfonate dispersing agent.

4. A low water loss additive for cements employed in wells including by weight, 40–55% hydroxyethyl cellulose having a particle size no larger than 80 mesh U.S. Seive Series a 2% aqueous solution of which has a viscosity at 20° C. of 225–325 centipoises, 2–10% polyvinylpyrrolidone having a molecular weight of the order of magnitude of 40,000, and 35–58% of a sodium salt of naphthalene sulfonate condensed with formaldehyde.

5. A low water loss additive for cements employed in wells including by weight, 52.5% hydroxyethyl cellulose having a particle size of nominally 80 mesh U.S. Seive Series a 2% aqueous solution of which has a viscosity at 20° C. of 225–325 centipoises, 10% polyvinylpyrrolidone having a nominal molecular weight of 40,000, and 37.5% sodium salt of a naphthalene sulfonate condensed with formaldehyde.

6. A cement slurry for wells including, hydraulic cement, water, and a low water loss additive as set forth in claim 1.

7. The method of cementing wells including, mixing a cement slurry including, hydraulic cement, water, and a low water loss additive as set forth in claim 1, introducing the slurry into a well and therein positioning the slurry, and allowing the slurry to harden.

References Cited in the file of this patent

UNITED STATES PATENTS

| 2,427,683 | Ludwig | Sept. 23, 1947 |
| 2,779,417 | Clark et al. | Jan. 29, 1957 |
| 2,881,142 | Eldridge | Apr. 7, 1959 |

OTHER REFERENCES

"PVP—Polyvinylpyrrolidone," published by Antara Chemicals, August, 1957, New York 14, New York, pages 10–16.